Figure 4:
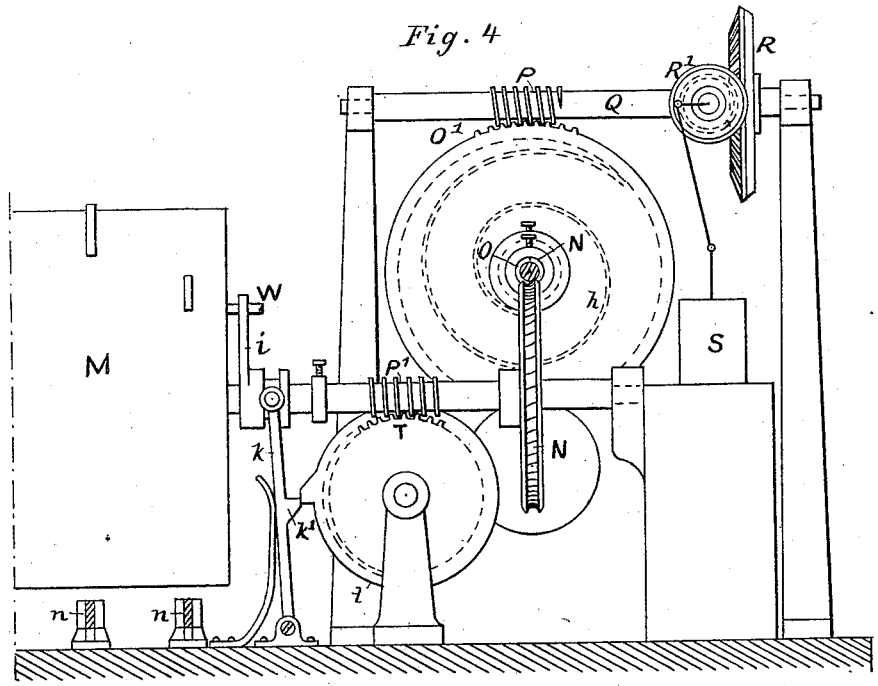

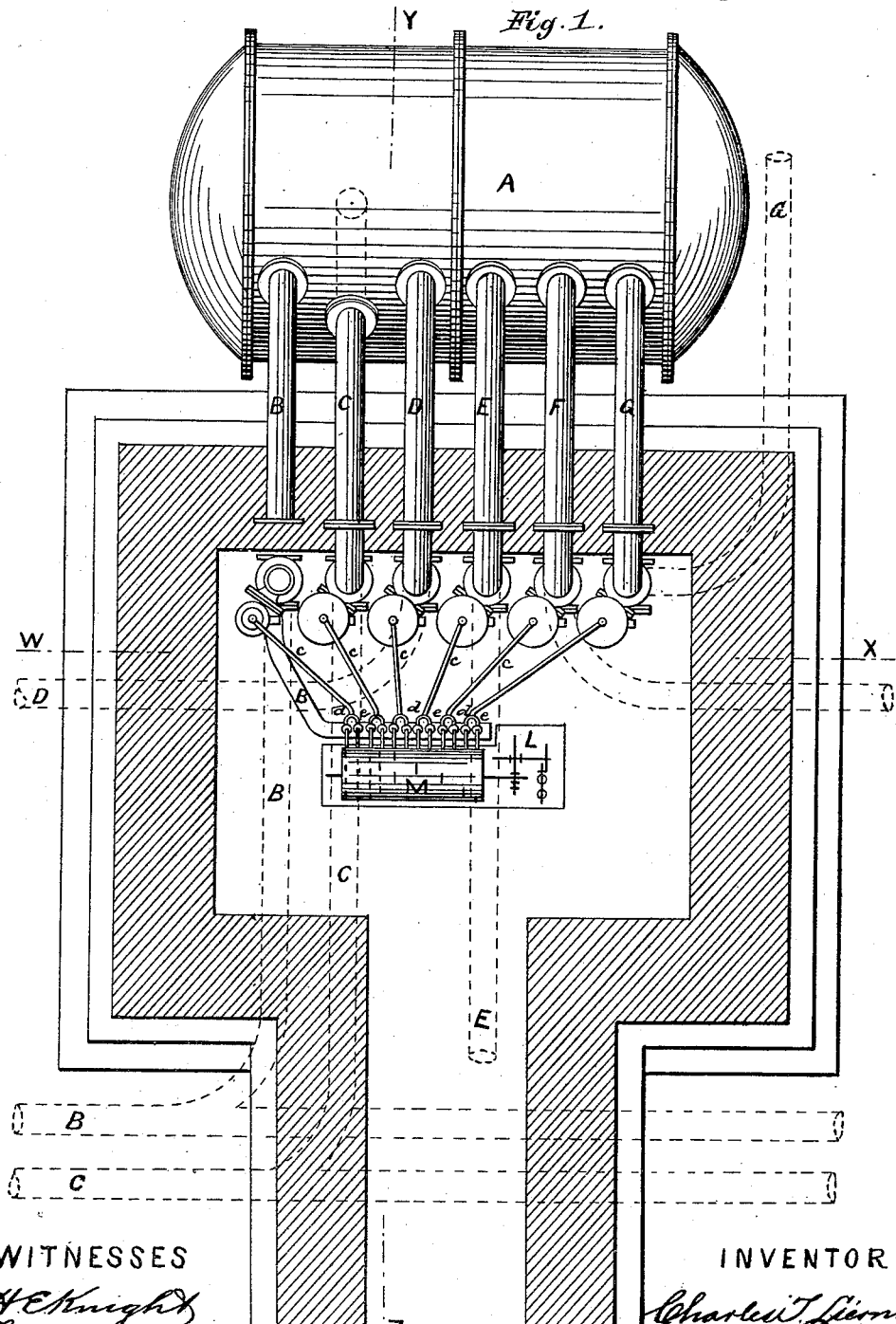

(No Model.) 4 Sheets—Sheet 2.
C. T. LIERNUR.
AUTOMATIC GEAR FOR PNEUMATIC SEWERAGE CONDUITS.
No. 264,717. Patented Sept. 19, 1882.
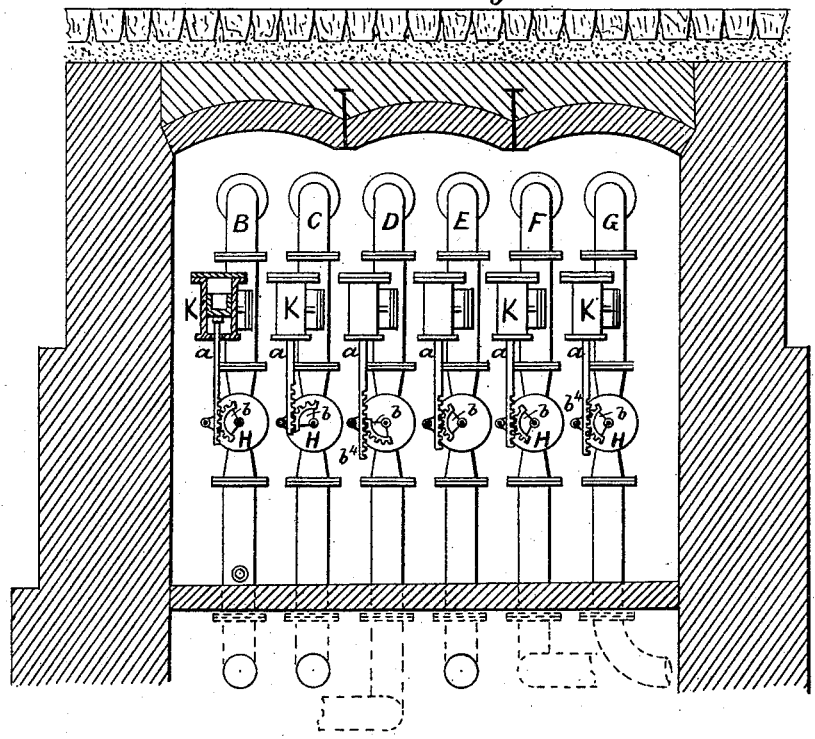
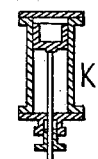
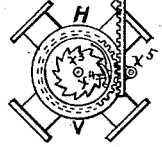
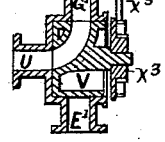
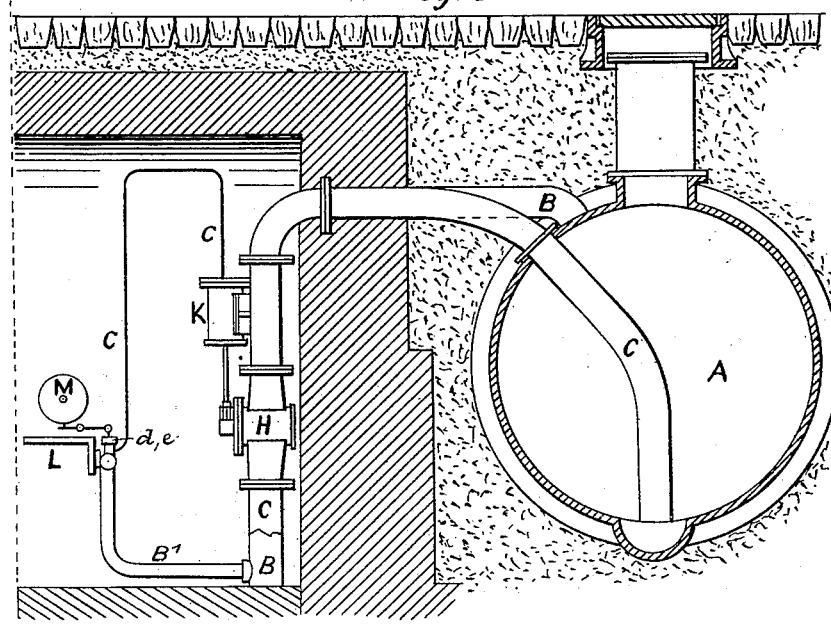
WITNESSES
INVENTOR (No Model.)

4 Sheets—Sheet 3.

C. T. LIERNUR.
AUTOMATIC GEAR FOR PNEUMATIC SEWERAGE CONDUITS.

No. 264,717. Patented Sept. 19, 1882.

Witnesses
H. E. Knight
D. W. Hopkins

Inventor
Charles T. Liernur
By Knight Bros
Attys (No Model.) 4 Sheets—Sheet 4.
C. T. LIERNUR.
AUTOMATIC GEAR FOR PNEUMATIC SEWERAGE CONDUITS.
No. 264,717. Patented Sept. 19, 1882.
Fig. 7.
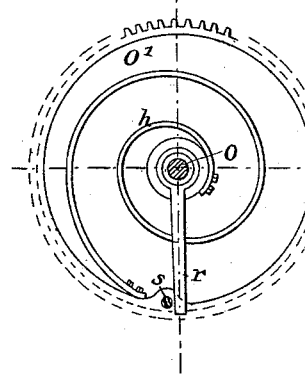
Fig. 6.
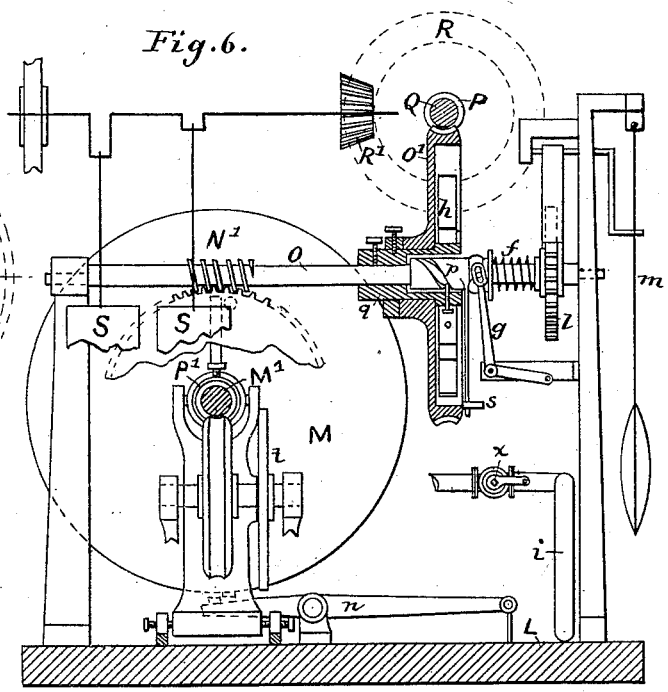
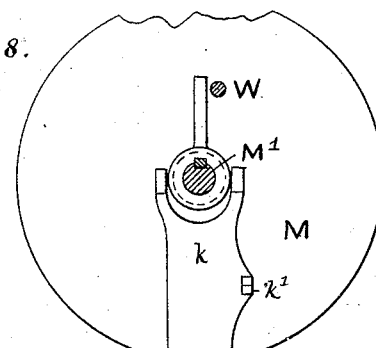
Fig. 8.
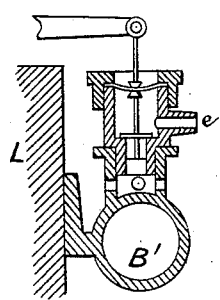
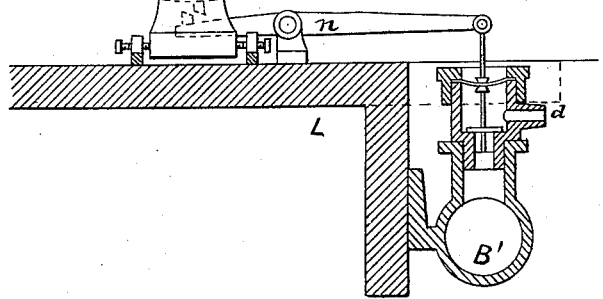
WITNESSES
H E Knight
INVENTOR
Charles T. Liernur
By Knight Bros
Attys

UNITED STATES PATENT OFFICE.

CHARLES T. LIERNUR, OF HAARLEM, HOLLAND.

AUTOMATIC GEAR FOR PNEUMATIC SEWERAGE-CONDUITS.

SPECIFICATION forming part of Letters Patent No. 264,717, dated September 19, 1882.

Application filed October 18, 1881. (No model.)

*To all whom it may concern:*

Be it known that I, CHARLES T. LIERNUR, engineer, resident in Haarlem, Holland, have invented a new and useful Automatic Gear for Working Pneumatic Sewerage-Conduits, of which the following is a specification.

This invention relates to the pneumatic sewerage system invented by me and carried out in different places for the removal of excremental matter from towns by means of air-pressure.

The principal parts of this system consist in a number of district reservoirs, also in the district pipes, by which the latter communicate with the branch pipes leading to the closets to be evacuated, and in the "mains" leading from the reservoirs to the engine-house from where the system is worked. These mains comprise two pipes lying by the side of each other, one serving to convey to the district reservoir the vacuum produced in the engine-house, while the object of the other one is to dispatch to the engine-house reservoir the fecal matter collected in the district reservoirs. When the evacuation of the closets into districts is to take place the cock or valve shutting off the district reservoir from the vacuum-pipe—*i. e.*, from the pipe leading to the air-pump in the engine-house—is first of all opened, and when a sufficient vacuum has been established in the reservoir it is closed again. The cocks of the district pipes being thereupon opened for a short while, the contents of the closets will be blown into the district reservoirs. Finally the cock of the dispatch-pipe is opened, in consequence whereof the contents of the district reservoir are forced into the main reservoir of the engine-house. Hitherto these cocks have always been manipulated by hand, which causes many inconveniences.

The object of my invention is to open and to close the said cocks automatically by means of a mechanism put in motion by the difference of the pressure of the air, and of the rarefied air contained in the vacuum-pipe, this mechanism being combined with a clock-work for regulating its working.

The invention is represented on the annexed four sheets of drawings.

Figure 5:
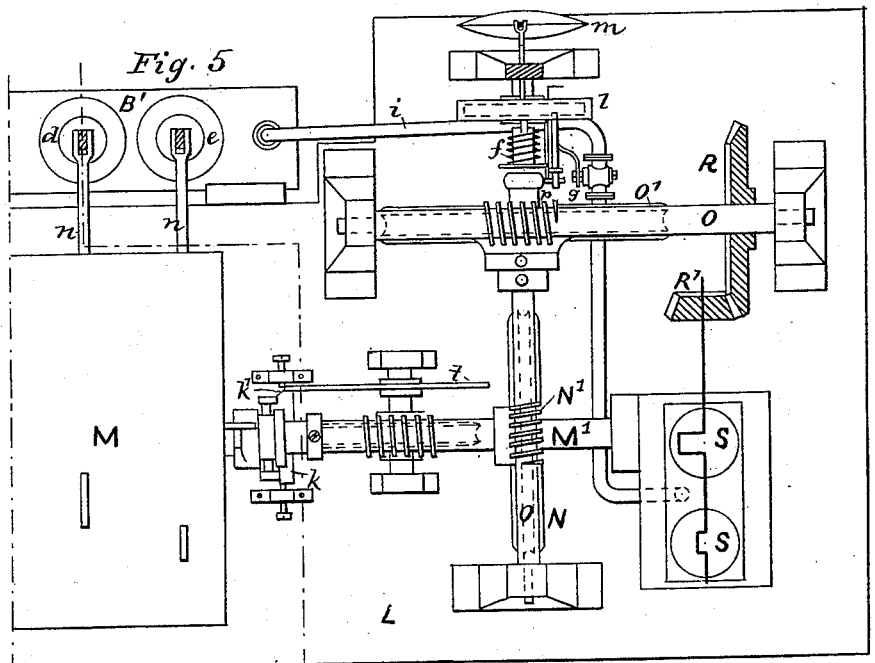

Figure 1 is a plan of a district reservoir with automatic gear attached; Fig. 2, section of chamber in which the apparatus is established on line W X, Fig. 1; Fig. 3, longitudinal section of chamber and reservoir on line Y Z, Fig. 1; Fig. 4, front view of clock-work for controlling the operation of the apparatus; Fig. 5, plan of clock-work; Fig. 6, end view of clock-work, partly in section; Fig. 7, front view of the wheel O'; Fig. 8, end view of the cylinder M with appertaining parts; Fig. 8$^a$, an air-valve belonging to the same in section; Figs. 9 to 11, three views of a four-way cock with arrangements for rotating its plug automatically in but one direction.

In Figs. 1 and 3, A is the district reservoir; B, the vacuum-pipe, connecting the said reservoir with the air-pump located in the engine-house; and C, the dispatch-pipe for conveying the contents of the district reservoir to the main or engine-house reservoir.

D, E, F, and G are pipes running through the different streets of the district, and from which branch off the pipes leading to the closets. The number of the pipes marked by the letters D, E, F, and G is variable. The six pipes thus shown in the drawings rise parallel to each other close to the back wall of the chamber. Each pipe is provided with a cock, H, and a vacuum-cylinder, K, the piston of which operates the plug of the cock by means of a rack, $b^4$, at the end of the piston-rod $a$, gearing with a toothed sector, $b$, which is keyed on the plug-stem, as clearly shown in Fig. 2. The cylinder in the present instance being open at the bottom, as shown at $a^4$, a vacuum created in the upper part of the same will cause the air-pressure to act from below against the piston and serve to lift it. When, on the other hand, air is allowed to enter into the cylinder from above, the piston will descend by its own weight. The cock is thus opened and closed by the motion of the piston.

For alternately establishing and neutralizing the vacuum in any one of the cylinders K, each of them is connected by a pipe, $c$, with the two small valves $d$ and $e$, (see also Figs. 8 and 8$^a$,) of which $d$ is in communication with the branch B' of the vacuum-pipe B, whereas $e$ communicates with the open air. All the valves $d$ and $e$ are fixed in a row on the table L, and each of them is provided with a lever, $n$, acted upon by pins or cams on the rotating cylinder M. (See Figs. 4, 5, and 6.) According, therefore, as the pins or cams on the cylinder M are arranged and the cylinder is rotated, the cocks H will be opened or closed and the district reservoir filled or emptied.

The cylinder M is driven from a spring, $h$, by the medium of a worm, N', on the shaft O and of a worm-wheel N. The latter is keyed on the shaft M' of the cylinder M. The shaft O, moreover, carries the escapement-wheel $l$, with which the escapement of the pendulum $m$ co-operates for the purpose of regulating the winding off of the spring $h$. In the same measure, however, as the spring $h$ gives out its force, it is wound up by a small two-cylinder vacuum-engine, S, this engine acting on the spring by the medium of the bevel-wheels R and R', the shaft Q, provided with worm P, and the worm-wheel O', to the circumference of which the outer end of the spring is fixed. The said spring thus serves for the transmission of motion from the vacuum-engine, but at the same time also for taking up and neutralizing the shocks produced by the interruptions of motion of the escapement-wheel. The vacuum-engine will thus have a continuous and easy motion in spite of the said shocks.

The degree of rarefaction of the air in the vacuum-pipe being variable, the apparatus requires to be provided with an arrangement by which the speed of the engine S can be so regulated as to cause the tension of the spring $h$ to remain approximatively uniform, and the oscillations of the pendulum to be isochronal. This is attained in the following manner:

On the worm-shaft O is fastened, by means of a set-screw or otherwise, the bush $q$, on which the worm-wheel O' rotates. Between the latter and the said bush the aforesaid spring $h$ is inserted, the same being fastened with one end to the rim of O' and with the other end to the bush $q$. The power given out by the engine S is thus first of all expended for winding up the spring $h$, and subsequently, after the spring has attained a certain degree of tension, for imparting motion to the pendulum $m$ and to the cylinder M. In case, now, the power of the engine should become too great on account of the vacuum being too high, so that thereby the clock-work might be unduly accelerated, the pin $s$, fixed on the wheel O', Figs. 6 and 7, bears against the arm $r$ of the sleeve $p$, placed loose on the shaft O and partly inclosed by the bush $q$. On its outer surface the sleeve $p$ has a helical groove, into which projects the pin $o$, screwed through the bush $q$. $f$ is a spring which presses the sleeve $p$ against the bottom of the cavity of $q$, and $g$ a lever, one end of which is connected in a suitable manner with the sleeve $p$. Its other end acts on a valve or cock, $x$, in the vacuum-pipe $i$, so that this valve or cock will be controlled by the displacement of the sleeve $p$. In case, now, the speed of the vacuum-engine becomes too great, the pin $s$ presses against the arm $r$, whereby $p$ is rotated relatively to $q$. In consequence thereof the sleeve $p$, which is guided by the pin $o$, will screw itself out of the bush $q$ and compress the spring $f$. By these means an increased resistance is opposed to the engine as the compression of the spring absorbs power. At the same time, however, the lever $g$ turns the plug of the cock $x$ in such a manner that the passage for the exhausting air becomes smaller. When the speed of the engine decreases the pressure of the pin $s$ against the arm $r$ diminishes and the spring $f$ expands. The resistance against the power of the engine is thereby lessened, and besides as the sleeve $p$ recedes the area of the passage in the cock $x$ is increased. The arrangement for regulating the speed of the vacuum-engine may, however, be executed in different manners, and it is not to form the subject-matter of a claim.

In the apparatus so far described the cylinder M would rotate continuously, and therefore cause the evacuation of the closets to be repeated without cessation. As a rule, however, this evacuation is to take place only once or twice a day. It is therefore necessary to let the cylinder stop after one revolution until its operation is again required. For this purpose it is placed loose on the shaft M', and a mechanism is provided which couples the cylinder with the shaft at the proper time, and which causes its disconnection after it has made one revolution. This mechanism is represented by Figs. 4, 5, and 8.

On the shaft M' there is a coupling part or driver, $j$, sliding on a feather and adapted to rotate the cylinder by means of friction or of teeth or of a simple pin. Moreover, a worm-wheel, T, is driven by a worm on the shaft M', while on the shaft of T is fixed a disk, $t$, provided with a tappet, $t'$, arranged so that it can press against the projection $k'$ of the lever $k$. This lever engages with its upper forked end into the peripherical groove of the driver $j$. The worm-wheel T and the disk $t$ make one revolution in twenty-four hours. The tappet $t'$ having, by means of the lever $k$, brought the driver $j$ close to the cylinder, the driver, upon touching the pin $w$, will put the cylinder in motion. When the cylinder has completed one rotation, and has thereby once opened and closed the different cocks, the tappet $t'$ leaves the projection $k'$, the spring $u$ pushes back the lever $k$, together with the driver $j$, and the cylinder stops. For the purpose of allowing one, two, or more evacuations of the closets to be effected every day, two or more disks $t$, of which the first has one tappet $t'$, the second two, the third three, &c., are arranged close to each other, and so that they may be shifted on the shaft. If the driver $j$ is maintained in constant engagement with the pin $w$, the evacuation of the closets takes place at every rotation of the cylinder. Instead of acting by means of a tappet, the disk $t$ may also be provided with a recess, while the lever $k$ is located on the opposite side of the disk and connected with the driver by suitable intermediate parts. The engagement of the coupling or driver would then take place whenever the lever $k$, impelled forward by its spring, enters with its projection $k'$ into the recess of the disk.

In operation, the arm $j$ being brought against the pin $w$, as stated, the cylinder M is carried around with its shaft M', causing the teeth on said cylinder to successively depress the free ends of the levers n of valves d and e, thus lifting said valves in succession. The lifting of the valve d, which is in communication with vacuum branch pipe B', causes a vacuum in upper closed end of corresponding cylinder, K. The piston therein is moved upward by atmospheric pressure, opening the corresponding cock, H, in the respective and successive pipes. The next tappet on the cylinder then opens the valve e in like manner, readmitting atmospheric pressure to the end of cylinder K. By the proper disposition of tappets or cam-projections on the cylinder M the successive cocks are thus opened and then closed, so as to first create a vacuum in the district reservoir. Then empty the closets into it in succession through the branch pipes, and then, when the district reservoir is charged, remove its contents to the main reservoir. The tappets controlling the vacuum-pipes may of course be arranged to produce a new vacuum in the district reservoir, after each opening of a branch pipe, or as often as necessary.

In the described mechanism for the automatic working of pneumatic sewerage-conduits various modifications may be introduced without causing any substantial change in the result to be obtained. Thus the cylinder M may be driven directly by the vacuum-engine instead of by the medium of a spring. Moreover, the engine may be made to work periodically only by starting it at the desired hour, like an alarm, by means of a clock-work, the motion of the engine being at the same time for winding the clock-work up again. The engine, instead of being of the ordinary two-cylinder system, as shown in the drawings, may be altered in various manners. Thus, for instance, an engine with three single-acting cylinders or a rotating engine might as well be employed for the purpose.

A further modification may be introduced in respect to the means for transmitting motion from the engine to the cylinder M and to the pendulum, as the worms and worm-wheels employed may be replaced by various other combinations of wheels. Moreover, the valves d and e may be exchanged for other appliances serving for the same purpose, and they may be acted upon by the cams of the cylinder M without the employment of levers. Finally, the communication between the reservoir and the various pipes may be established and interrupted by slide-valves or other equivalent devices; or, if preferred, the cocks may be altered, as shown by Figs. 9, 10, and 11. In this arrangement, for instance, four district pipes are to be connected with the four branches D', E', F', and G' of a cylindrical or conical case, which is in communication by a central branch, U, with the pipe leading to the reservoir. Inside of this case a cylinder or plug, V, turns, provided with a curved passage corresponding to the branches D' E', &c., so that each of the radial branches may be made to communicate with the central branch, U, while the other branches are closed. For the purpose of successively establishing communication between the radial branches and the branch U, the cylinder requires to be rotated in one direction only, and for effecting this also automatically a ratchet-wheel, $x^3$, and pawl $x^4$ are inserted between the pivot of the cylinder V and the spur-wheel $v$, operated by a rack-bar, $x^5$, on the piston-rod of the vacuum-cylinder K, the said ratchet-wheel and pawl serving to convert the alternating motion of the piston-rod into a uniformly-directed rotative motion of the cylinder V. The vacuum-cylinder K has in this case been made double-acting, in order that it may be used in a horizontal position, if desired.

The term "double-acting" has reference to a cylinder provided with closed ends, and connected with air-pipes for alternately applying pressure or creating a vacuum on opposite sides of the piston, whereby the four-way cock is operated through the rack-and-pinion and ratchet-and-pawl mechanisms shown in Figs. 9 and 10.

Having thus described my invention, I desire it to be understood that the mode of delivering the contents of closets or sewer-pipes into the receiving tank or district reservoir by means of a vacuum produced in the latter forms no part of the present invention; neither is it my intention to claim discharging the contents of said district reservoir into a main reservoir. The invention relates altogether to the novel system of controlling the various valves and other devices for filling and discharging the district reservoirs in an automatic manner, as has heretofore been fully described.

I claim as my invention—

1. In combination with the vacuum-pipe B of a pneumatic sewerage system, and with the cocks or valves H or their equivalent inserted in the different pipes, the vacuum cylinder or cylinders K, and the vacuum-engine S, regulated by clock-work, for the purpose of opening and closing the said cocks or valves H, substantially as hereinbefore described.

2. In combination with the vacuum cylinder or cylinders K, the valves or cocks d and e, operated upon by the cylinder M, provided with pins or cams, and which is rotated by the vacuum-engine S, and a suitable intermediate mechanism, substantially as and for the purpose set forth.

3. In combination with the cam-cylinder M and the mechanism for imparting motion to the same, the disk $t$, slowly rotated by the said mechanism, and provided with one or more tappets or recesses, which, by means of lever $k$ or its equivalent, cause the coupling or driver $j$ to be shifted periodically, so as to effect a rotation of the cylinder M by the shaft M', as hereinbefore specified.

In testimony whereof I have signed my name to this specification in the presence of two subscribing witnesses.

CHARLES T. LIERNUR.

Witnesses:
CARL PIEPER,
BERTHOLD ROI.